Patented Mar. 1, 1938

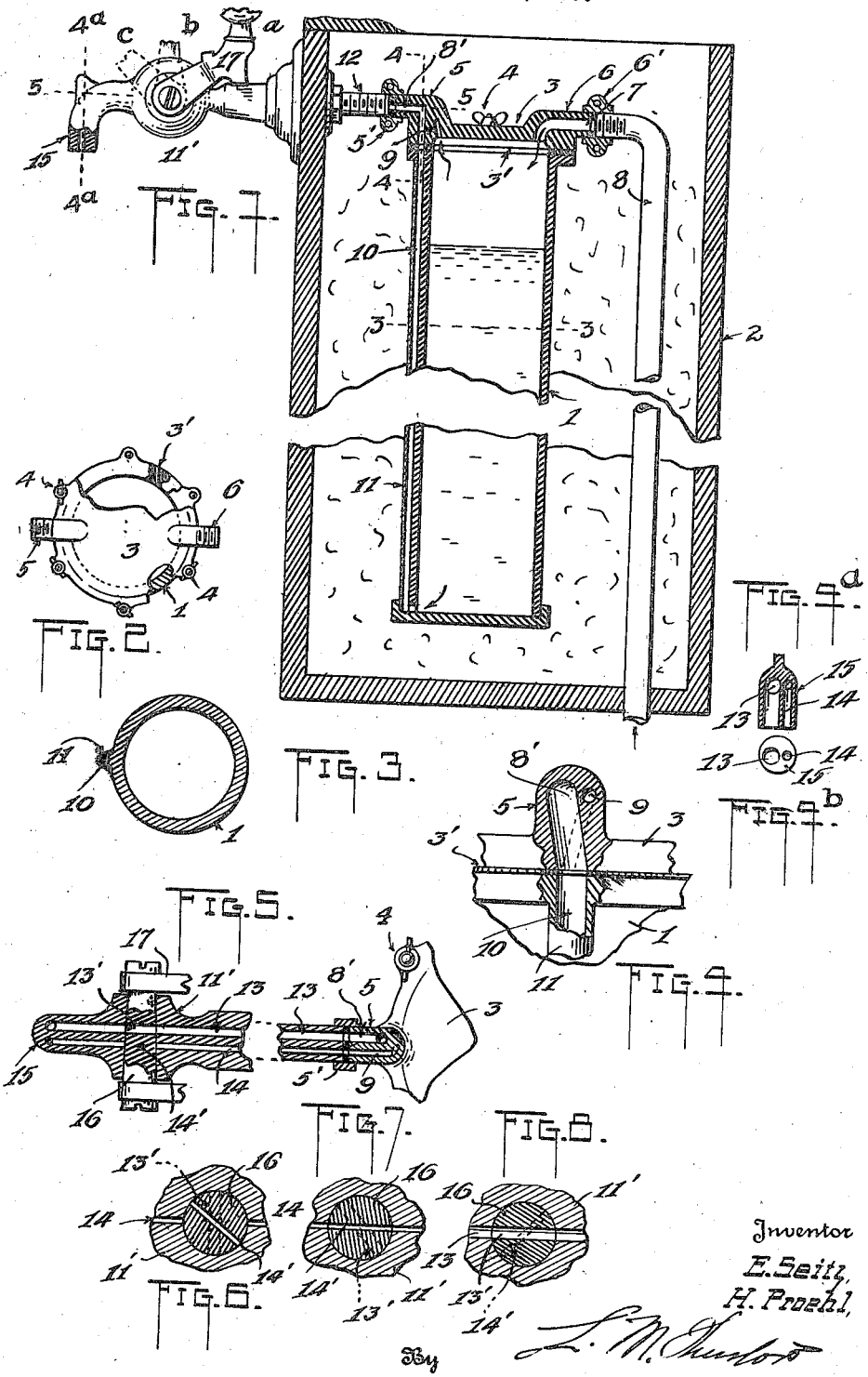

2,109,978

UNITED STATES PATENT OFFICE 2,109,978

DISPENSING APPARATUS

Edward Seitz and Howard Proehl, Peoria, Ill.

Application October 26, 1935, Serial No. 46,888

1 Claim. (Cl. 225—9)

This invention pertains to improvements in apparatus for dispensing beverages of the carbonated variety, including beer. It also pertains to a method of dispensing such beverages.

It has for one of its objects the provision of an apparatus by which the beverage and certain of the free gases may be drawn off separately from a container through separate passages of a faucet to the end that a given amount of such beverage may be dispensed in perfect form without waste, and without too great an amount of foam where the gas content might be excessive.

Another object is to draw from a container a beverage such as beer through an outlet of a dispensing faucet while at the same time permitting free gas to be automatically dispersed through a faucet outlet separate from the outlet for the beer so that the thus dispensed beverage will not be too greatly charged with gas. Further, that the gas will be automatically released from such container at such rate while dispensing the beer that the liquid in the container in replacing the gas will be maintained at a practically constant level thus insuring a full or ample supply of beer at all times.

Again, an object lies in providing a carbonated-beverage faucet having two separate discharge openings in its nozzle portion and wherein no mixing of the commodity with too great an amount of gases can result in drawing such commodity.

Further, an object is to provide a new method of dispensing a carbonated beverage.

Heretofore it has been the practice to dispense beer through a faucet having a single outlet with the result that more gas than is necessary for a proper amount of foam is carried with the liquid, and this has required considerable manipulation on the part of the attendant, and much time in removing the foam and replacing it with a more solid content, entailing at the same time much waste of the liquid.

With the end in view of avoiding these difficulties the apparatus to be described has been provided.

Naturally, pressure is always maintained upon the beer in the container or receiver due to carbonating, and when a receptacle containing the beer is opened the gas due to the usual carbonating step tends to bring the beverage to turbulence, flowing in that condition from the dispensing faucet. A certain amount of the gas is, of course, required to present a proper taste and to leave upon the drawn beer a suitable pleasing amount of foam; too much gas, however, leading to the objections named. In addition to the gas in the liquid an amount of gas collects in the receptacle above the liquid, and one of the objects is that this free gas be released from time to time in small amounts, as beer is drawn off, this release being automatic in each operation of the faucet-arm as will appear in the following description.

In the appended drawing forming part hereof:

Figure 1 is a sectional elevation of a beer receptacle housed in an ice compartment part of the structure entering into the invention, being illustrated together with a beer faucet of a novel type.

Figure 2 is a plan of the beer receptacle with parts broken away to show structures.

Figure 3 is a transverse section of the beer receptacle on line 3—3 of Figure 1.

Figure 4 is a section of parts taken on line 4—4 of Figure 1.

Figure 4$^a$ is a transverse section of part of the faucet taken on line 4$^a$—4$^a$ of Figure 1. Figure 4$^b$ shows the lower or discharge face of the faucet.

Figure 5 is a longitudinal section of parts of the faucet on a large scale, taken on line 5—5 of Figure 1, and Figures 6, 7, and 8 are transverse sections of parts of the faucet showing three different positions of the plug or dispensing member thereof.

In the first figure of the drawing 1 denotes a receiver, which may be of metal, for containing the liquid to be dispensed, this member being housed within a tank 2 containing ice or other cooling agent. To said receiver is secured a cover-plate or cap 3 by means of bolts, and wing-nuts 4, for example, may be employed by which easy removal of the cap is made possible. Extending from opposite edges of the cover-plate are threaded stubs 5 and 6, the latter having an inlet 7 for connection with a supply pipe 8 through which liquid (beer) is introduced to said receiver, there being a suitable clamping connection at 6' for connecting the two described parts.

The extension or stub 5 is provided with passage 8' for conducting beer, and a smaller passage 9 for conducting gas naturally contained in said receiver 1. The latter passage opens through the cover-plate or cap into the top space or cavity of the receiver, while the passage 8' is in register with the passage 10 of a tubular part 11 which, preferably, and in this instance, lies outside the receiver, extending from bottom to top of the same, and opening at its lower end into the lower space of the said receiver where the beer is naturally coolest.

Interposed between the top of the receiver 1 and cover-portion 3 is a gasket 3' which is perforated by which the passages 8' and 10 may communicate.

At 11' is a faucet which presents exteriorly the same general outward appearance as any usual beer faucet, there being an extended pipe portion or stub 12 having passages 13 and 14, the end of said stub abutting the named stub 5 in such manner that the said passages 13 and 14, will register with the passages 8' and 9, respectively, and in such manner, also, that there will be no communication of the beer passage with the gas passage, a suitable clamp 5' being provided for connecting purposes. The passages 13 and 14 extend the full length of the faucet-body and terminate the delivery face of the nozzle portion 15 as suggested in figures 4a and 5. However, the passages within the faucet are interrupted by the transverse bore of the faucet-body which receives a plug 16, or dispensing member, this having a pair of passages that open through the same at certain positions thereof at different times, the said passages of the plug being denoted by 13' and 14' to register with the passages 13 and 14, respectively, of the said faucet-body. The named passages of the plug lie at angle to each other, being so disposed that in the position $a$ of the operating lever 17, Figure 1, there would, of course, be no communication of the passages 13, 14 through the plug, see Figure 6. However, when the faucet-arm 17 is moved to about the half-way position $b$ the passages 14 and 14' will be in communication through said plug as in Figure 7 thereby permitting escape of a small amount of gas from the receiver 1. Now, as the lever reaches the final forward position $c$ the plug-passage 13' opens the beer passage from the said receiver 1, this position being shown in both Figures 5 and 8. In closing the faucet by restoring the faucet-arm or lever 17 to the normal position, at $a$ the actions just named are reversed, that is to say, these actions are in reverse order, as Figures 8, 7, and 6 will show when studied in that order of reading.

Otherwise stated, in the movement to "off" position gas is again liberated through passage 14' after the beer has been drawn. It is to be noted that in any one of the figures just referred to only those passages of the faucet-body 11' and plug 16 are shown in full that are in use, or about to be used.

As already noted, also, each passage 13, 14 has its own outlet or discharge at the nozzle 15 of the faucet so that the beer and gas are separately discharged from the latter and particularly since the passage 9 for gas at the receiver opens from the topmost part thereof nothing but gas is expelled. As the gas passage controlled by the plug 16 of the faucet is exposed at each opening and closing movement of the faucet-arm 1 a small amount of gas is liberated from the receiver and at each gas loss there is a small flow of the beer through pipe 8 to the said receiver for replenishment purposes. That is to say, at each drawing of beer gas has been automatically discharged from the receiver twice through the passage 14' of the faucet and since the inflow of beer to the receptacle is also automatic it is clear that as pressure of gas in the latter is released an amount of beer will flow from pipe 8 in proportion to the amount of gas released. In this way the beer in the receiver can never be wholly discharged being replaced intermittently following the intermittent release of gas volumes as already stated.

In the act of drawing the beer in the opening and closing movement of the faucet, then, it is clear that the gas release is entirely automatic, and it may be stated that the bore of the escape passage for such gas release may be so proportioned in respect to the capacity of the receptacle 1 that just the right amount of gas is released, or to the end that the level of beer will be maintained substantially constant, assuring a proper bulk thereof at all times.

It is now seen that beer may be drawn having only an amount of gas therein to give proper life thereto, and that the "free" gas under considerable pressure in the top of the closed receiver cannot force its way to the faucet to any great extent but is constantly being released through a separate free passage where it can have no effect upon the drawn liquid which is clear and substantial.

In initially filling the receiver, the faucet may be opened to release the air from said receiver 1 to allow inflow of the beer to the desired extent following which with a closed faucet, in the manner set forth, substantially a constant level is maintained.

It is to be understood that slight changes may be made in the structure while accomplishing the desired purpose, such changes lying within the meaning of the submitted claim.

We claim:

A carbonated liquid dispensing apparatus including in combination, an open top container, there being a passage leading from its top to near the bottom thereof and opening into the space of said container, a closure or cap arranged to be secured upon the top closing the opening and including an inlet for the liquid to be dispensed, and also having a passage leading from the space of the container through and outside the closure or cap, the latter also having a passage connected with the passage of the container, and a faucet including two separate and independent passages each being separately connected with one of the passages of such closure or cap, said passages of the faucet extending to and opening at the discharge face thereof.

EDWARD SEITZ.
HOWARD PROEHL.